United States Patent
Abler et al.

(10) Patent No.: US 6,928,086 B2
(45) Date of Patent: *Aug. 9, 2005

(54) DYNAMIC DETECTION OF LAN NETWORK PROTOCOL

(75) Inventors: Joseph Michael Abler, Raleigh, NC (US); Francis Edward Noel, Jr., Durham, NC (US); Lorrie A. Tomek, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 113 days.

This patent is subject to a terminal disclaimer.

(21) Appl. No.: 10/293,607

(22) Filed: Nov. 13, 2002

(65) Prior Publication Data

US 2003/0067884 A1 Apr. 10, 2003

Related U.S. Application Data

(63) Continuation of application No. 08/976,203, filed on Nov. 21, 1997, now Pat. No. 6,504,851.

(51) Int. Cl.[7] ............................ H04J 3/16; H04L 12/28; H04Q 11/00; G06F 15/16
(52) U.S. Cl. ..................... 370/465; 370/257; 370/359; 370/420; 709/230; 709/249; 709/250
(58) Field of Search ........................... 709/226, 223, 709/224, 225, 220, 221, 222, 249, 250; 370/445, 465, 466, 467, 401, 400, 419, 420, 402, 469, 464, 254, 389, 395

(56) References Cited

U.S. PATENT DOCUMENTS

| | | | | |
|---|---|---|---|---|
| 5,436,902 A | * | 7/1995 | Mcnamara et al. | 710/1 |
| 5,699,350 A | * | 12/1997 | Kraslavsky | 370/254 |
| 5,905,874 A | * | 5/1999 | Johnson | 395/200.8 |
| 6,070,199 A | * | 5/2000 | Axtman et al. | 710/1 |
| 6,072,803 A | * | 6/2000 | Allmond et al. | 370/445 |
| 6,134,678 A | * | 10/2000 | Mahalingam et al. | 714/48 |
| 6,226,680 B1 | * | 5/2001 | Boucher et al. | 709/230 |
| 6,393,483 B1 | * | 5/2002 | Latif et al. | 709/226 |
| 6,504,851 B1 | * | 1/2003 | Abler et al. | 370/466 |

* cited by examiner

*Primary Examiner*—Hanh Nguyen
(74) *Attorney, Agent, or Firm*—Joseph T. Van Leeuwen; Carlos Munoz-Bustamante

(57) ABSTRACT

A method and apparatus for multi-protocol LAN support, which is applicable to Ethernet, Token-Ring, and Asynchronous Transfer Mode (ATM) protocols. The LAN support is located at a workstation and provides for automatic determination of the LAN protocol type and speed. A common adapter card is provided for use in the workstation to interface the workstation to any of the LANs of interest. A four-step sequential process is taught for determining the protocol type and speed.

19 Claims, 8 Drawing Sheets

| RJ-45 CONTACT ASSIGNMENTS | | | |
|---|---|---|---|
| RJ-45 CONTACT | TR 4/16 | ATM 25/155 | ENT 10BASE-T/TX-100 |
| 1 | NOT USED | TD+ | TD+ |
| 2 | NOT USED | TD- | TD- |
| 3 | TX-A | NOT USED | RD+ |
| 4 | RX-A | NOT USED | NOT USED |
| 5 | RX-B | NOT USED | NOT USED |
| 6 | TX-B | NOT USED | RD- |
| 7 | NOT USED | RD+ | NOT USED |
| 8 | NOT USED | RD- | NOT USED |

*FIG. 1*
*(PRIOR ART)*

DYNAMIC DETECTION OF LAN NETWORK PROTOCOL

DYNAMIC DETENTION OF LAW NETWORK PROTOCOL

This application is a continuation of application Ser. No. 08/976,203, filed Nov. 21, 1997, now U.S. Pat. No. 6,504,851.

FIELD OF THE INVENTION

The present invention relates to the field of computer networking, specially to the field of local area networks using Ethernet, Token-Ring, or Asynchronous Transfer Mode protocols.

BACKGROUND OF THE INVENTION

The present invention is an adapter card for a workstation or personal computer for receiving any of the Ethernet, Token-Ring, or Asynchronous Transfer Mode (ATM) protocols, and automatically determining which protocol is presently active and the speed at which it is operating.

Historically, numerous protocols have evolved for local area networks (LANs). Three of the most popular protocols are Ethernet, Token-Ring, or Asynchronous Transfer Mode (ATM). The diversity of protocols has created a problem for manufacturers of electronic equipment, such as computers, file servers, hubs, printers, and like equipments that connect to LANs. The problem is how to build hardware to attach workstations to the local area networks that is compatible with a plurality of protocols. In recent years, the problem has been further complicated by the introduction of a second higher performing versions of the Ethernet, Token-Ring, or Asynchronous Transfer Mode protocols. Ethernet now operates at 10 MHz rates (called 10 Base-T) and 100 MHz rates (called 100 Base-TX), Token-Ring operates at either 4 or 16 MHz rates, and ATM operates at either 25 or 155 MHz rates.

One simple solution to the problem, which has been implemented in the prior art, is to manufacture a different pluggable card type to support each of the different network protocols and speeds. The user would buy the type of pluggable card required to interface with the network protocol that was available in his office or building. This is not an ideal solution, because the vendor requires more development funds and a larger inventory of parts, while the user buys an inflexible solution and also requires a larger inventory of parts. The industry has evolved to more flexible solutions using a single card type that has automatic detection of the protocol type and speed. This is possible, because a standardized connector has evolved which requires the protocols of interest to be standardized to the same physical connector called RJ-45. FIG. 1 shows the RJ-45 contact assignments and how they differ for the protocols of interest.

In U.S. Pat. No. 5,574,722, "Protocol Independent Switch" by Slykhouse et al., Slykhouse teaches a method for automatically determining the network protocol, either Token-Ring or Ethernet, for a network hub or concentrator. Slykhouse uses the RJ-45 pin connections as shown in FIG. 1 and teaches hardware for listening for a frame on specific pins to differentiate between Token Ring or Ethernet. The present invention uses the RJ-45 pins to help in the automatic determination of the LAN protocol being used but, in addition, requires recognizing the media access control (MAC) layer protocol differences. The present invention requires a more complex mechanism for automatic protocol determination because of the additional ATM protocol and additional speed selections allowable for Ethernet and ATM. The present invention is not an obvious extension of Slykhouse's method but involves media speed/encoding detection hardware and active transmission of test frames which loopback to the sender and are non-intrusive in nature. This is vastly different than Slykhouse's passive listening method. The present invention also differs from Slykhouse in the field of application. Slykhouse provides a method for network protocol detection in the networking infrastructure device (hub or concentrator), while the present invention is for an adapter card in a workstation.

In U.S. Pat. No. 5,249,183, "Interfacing Unit for Local Area Networks" by Wong et al., Wong teaches a mechanism for an Ethernet adapter to provide attachment to a traditional Ethernet coaxial network or an Ethernet twisted pair (10 Base-T) network. The adapter automatically selects the network that is active by first checking for activity on the 10 Base-T network by sensing the presence of link integrity pulses. If the 10 Base-T network is inactive, it then uses the coaxial network. The approach for detecting Ethernet activity (presence of link integrity pulses) is the same listening approach used in the present invention. Detection allows the adapter to select the appropriate Ethernet media to use. However, Wong applies only to selection of the appropriate physical media specifically for an Ethernet network, whereas the present invention applies to selection of the appropriate protocol used by the network, that of Token-Ring, Ethernet, or ATM.

Wong's method is passive, but the present invention involves media speed/encoding detection hardware and active transmission of test frames which loop back to the sender and are non-intrusive in nature.

In U.S. Pat. No. 5,142,528, "Protocol Selector and Protocol Selection Method" by Kobayashi et. al., Kobayashi teaches a mechanism for two stations which support multiple protocols to negotiate the protocol to be used. Generically, this is accomplished through the use of an independent communication port over which the protocol to be used by the primary communication port is negotiated. Kobayashi also teaches the specific case of negotiating B channel protocols over the D channel of an Integrated Services Digital Network (ISDN) link. This does not relate to the present invention in that no independent communication channel exists for determining or negotiating the protocol used by the primary channel. The present invention deals with determining the operational protocol of a LAN network in a non-disruptive manner and then attaching to the network. Negotiation of the operating protocol is not part of the process.

In U.S. Pat. No. 5,497,460, "System and Method for Determining Network Connectivity" by Bailey et al., Bailey teaches a mechanism for providing automated detection of the LAN protocol for a network interface card in a workstation that supports multiple protocols. The automated detection mechanism in the workstation detects the protocol utilized by the networking infrastructure device to which the workstation is attached. This is the same problem solved by the present invention. Bailey's method differs in that the process proposed by Bailey can be disruptive, and the present invention is non-disruptive. Bailey detects the protocol by sending a logical link control ("LLC") frame—which is a potentially disruptive process. The present invention does not send any frames which may be disruptive during the protocol detection process. In addition, the transmission of LLC frames proposed by Bailey is applicable only to Ethernet and Token-Ring but not for ATM. The present invention provides detection for Ethernet, Token-Ring, and ATM.

In U.S. Pat. No. 5,442,629, Token Ring Speed Detector" by Geyer et al., Geyer teaches a method and apparatus for determining LAN speed for Token-Ring LANs by choosing between the two standard Token-Ring speeds: 4 MHz and 16 MHz. Geyer's method applies only to Token-Ring. Geyer's teachings are applicable to the present invention in that Geyer's method is used directly to supplement the present invention by determining at what speed the Token-Ring is operating after the present invention determines that the connected LAN is Token-Ring. Geyer differs from the present invention in that it does not provide automatic determination of the LAN type from amongst three candidates: Ethernet, Token-Ring, and ATM.

In U.S. Pat. No. 5,530,842, "Generic Backplane System Which Is Configurable to Serve Different Network Access Methods Simultaneously" by Abraham et al., Abraham teaches a mechanism for supporting multiple protocols over a generic backplane of a communications hub or concentrator. Separate modules, which are protocol and physical network specific, are still provided for attaching to the appropriate LAN network. Abraham's invention is specific to the implementation of a hub backplane which, in essence, is a proprietary LAN network. It does not specifically address the attached protocols, i.e., protocols can be translated or encapsulated within the backplane network of Abraham. The backplane network must carry all protocols of the attaching networks, it does not need to specifically and completely conform to any one of the networks. The present invention is for devices attaching to standard LAN networks where the attaching device must specifically and completely conform to the attaching network, and the present invention provides the mechanism for doing so.

In IBM Technical Disclosure Bulletin, Vol 29, No 2,. July 1986, the article, "Method to Establish a Network Connection Dynamically," teaches a method of connection setup at the Network Layer of the protocols. The article applies to a different protocol layer and has no relation to the present invention which addresses LAN operation at the MAC and physical (PHY) layers.

In IBM Technical Disclosure Bulletin Vol. 29, No. 9, February 1987, the article "ECL Reconfiguration Using a Circuit Switch," teaches a method for configuring switches for internal port to port connections. It does not provide for the configuration of protocols. It is therefore not related to the present invention but applies to the configuration of LAN hardware.

In U.S. Pat. No. 5,568,525, "System and Method for Connection of Multiple Protocol Terminals" by de Nijs et al., de Nijs teaches a mechanism for automated network configuration. De Nijs differs from the present invention in that de Nijs provides network configuration at the networking infrastructure device. The present invention provides network configuration at the user workstation. In addition, de Nijs uses a mechanism of detection of protocol based on characteristic impedance of the transmission media. This is different from the present invention's detection mechanism, which is based on PHY/MAC layer of Ethernet, Token-Ring, and ATM.

In U.S. Pat. No. 5,586,117, "Method and Apparatus Which Allows Devices with Multiple Protocol Capabilities to Configure to a Common Protocol Configuration" by Edem et al., Edem teaches an automatic determination method for Ethernet only to distinguish between the 10 and 100 MHz versions. Edem teaches a scheme using clock pulses to match configurations between a workstation and a network infrastructure device. Edem's method differs from the present invention in that it does not provide a mechanism to distinguish between differing LAN protocols.

In European Patent 577,435 A1, "Common Interface for a Communication Network" by Hutchison et al., Hutchison teaches a common interface for Ethernet only. Hutchison teaches a mechanism to distinguish between Ethernet interfaces-Attachment Unit Interface (AUI) or 10 Base-T. Hutchison differs from the present invention in that Hutchison does not provide a mechanism to distinguish between differing LAN protocols.

Japanese Publication 06-085848 teaches the detection of 10Base-T Ethernet vs. Integrated Services Digital Networks (ISDNs). The scheme taught in the publication is to use a filter to distinguish the signal frequency (10 Mb vs. 56 Kb). The Japanese publication differs from the present invention in that it does not use pin assignments or protocol information. The Japanese publication also differs from the present invention in that it does not consider Token-Ring or ATM.

It is a further object of this invention to provide a LAN adapter that detects whether the network connection of a workstation is Ethernet, Token-Ring, or ATM, and adapts automatically to the type and speed of the attached network.

It is a further object of this invention to provide protocol type and speed detection using active transmission of test frames on a non-disruptive basis that does not affect the operation of the network in relation to other attachments during the protocol search process.

It is an object of this invention to provide a single apparatus for the support of multiple LAN protocols where several different speeds options are supported for each of the multiple protocols and that this detection occurs in an optimal sequence (i.e., most likely conditions are detected first in order to minimize setup time for the user).

SUMMARY OF THE INVENTION

In accordance with the invention, a method and apparatus is provided for multi-protocol LAN support, which is applicable to Ethernet, Token-Ring, and Asynchronous Transfer Mode (ATM) protocols. The LAN support is located at a workstation or personal computer and provides for automatic determination of the LAN protocol type and speed. A standard connector called RJ-45 is used to connect the workstation to the LAN, regardless of the LAN protocol. All of the LANs of interest use the RJ-45 connector but use different contact assignments as shown in FIG. 1.

An adapter card is provided for use in the workstation to interface the workstation to any of the LANs of interest. The card uses the RJ-45 connector to interface to the LAN and contains circuitry to adapt the LAN to the workstation's input/output (I/O) bus. A single LAN having one of the protocols of interest (Ethernet, Token Ring, or ATM) is attached via the RJ-45 connector and the adapter card will automatically detect the LAN type and respond to it. In addition, the adapter detects and supports one or more speeds for each LAN type. For example, the adapter could be structured to support two different speeds for each LAN type as follows: Ethernet operating at 10 MHz rates (called 10 Base-T) and 100 MHz rates (called 100 Base-TX), Token Ring operating at either 4 or 16 MHz rates, and ATM operating at either 25.6 or 155 MHz rates. The speeds used in this example are used throughout this disclosure, but other speeds which are defined using the RJ-45 connector with the same pin assignments are within the scope of the invention.

The automatic determination of LAN type and speed is accomplished using four sequential steps, with each step providing a unique function. A summary of the four steps is as follows:

Step 1—Ethernet Detection: The Ethernet network will always have detectable activity on the receive line within a maximum time period of 24 ms. RJ-45 contact assignments guarantee that a Token Ring or ATM network do not cause activity on the RJ-45 3/6 pair. Therefore, activity on this pair indicates an operational Ethernet network. Once determined to be Ethernet, the adapter will send messages on the transmit link to differentiate between 10 Base-T or 100 Base-TX operation.

Step 2—Token-Ring Detection: The adapter transmits and detects the reception of a loopback message at 16 Mbps over the RJ-45 contacts assigned for Token-Ring. If the loopback message returns to the workstation, then the protocol must be Token-Ring. Once determined to be Token-Ring, the normal ring speed listen protocol will determine the correct data rate.

STEP 3—ATM Detection: The process of determining ATM-25 or ATM-155 first involves listening for both media speeds. First, the adapter sets the transceiver for media speed 155 Mbps and listens (receives frames from the network). If properly framed idle cells are received, then the link is ATM-155. If an ATM-155 link is not detected, then the transceiver is set for media speed 25.6 Mbps and the adapter listens. If properly decoded idle characters are received, then the link is ATM-25. If neither listening attempt indicated the ATM media speed, then the workstation adapter will attempt transmission of idle characters at both speeds. If the workstation detects a valid signal being returned, then ATM connection of the associated speed is determined. Transmitting on an ATM link to determine the line speed is non-disruptive to the network because ATM is a point-to-point switched network.

STEP 4: No LAN Detected: In the event that the first three steps have failed to determine the network protocol, then the workstation detects an error event and makes appropriate notification to the user.

The network adapter of the present invention is provided as either a planar embedded function of the workstation or as network interface card which is mounted on the adapter card.

The advantages of this invention will become apparent from the following detailed description of the presently preferred embodiments of the invention, taken in conjunction with the accompanying drawings.

BRIEF DESCRIPTION OF THE DRAWINGS

FIG. 1 is a table showing the contact assignment differences for the standard RJ-45 connector when connecting to Ethernet, Token-Ring, or ATM according to the prior art.

DETAILED DESCRIPTION OF A PREFERRED EMBODIMENT OF THE INVENTION

Figure 2:
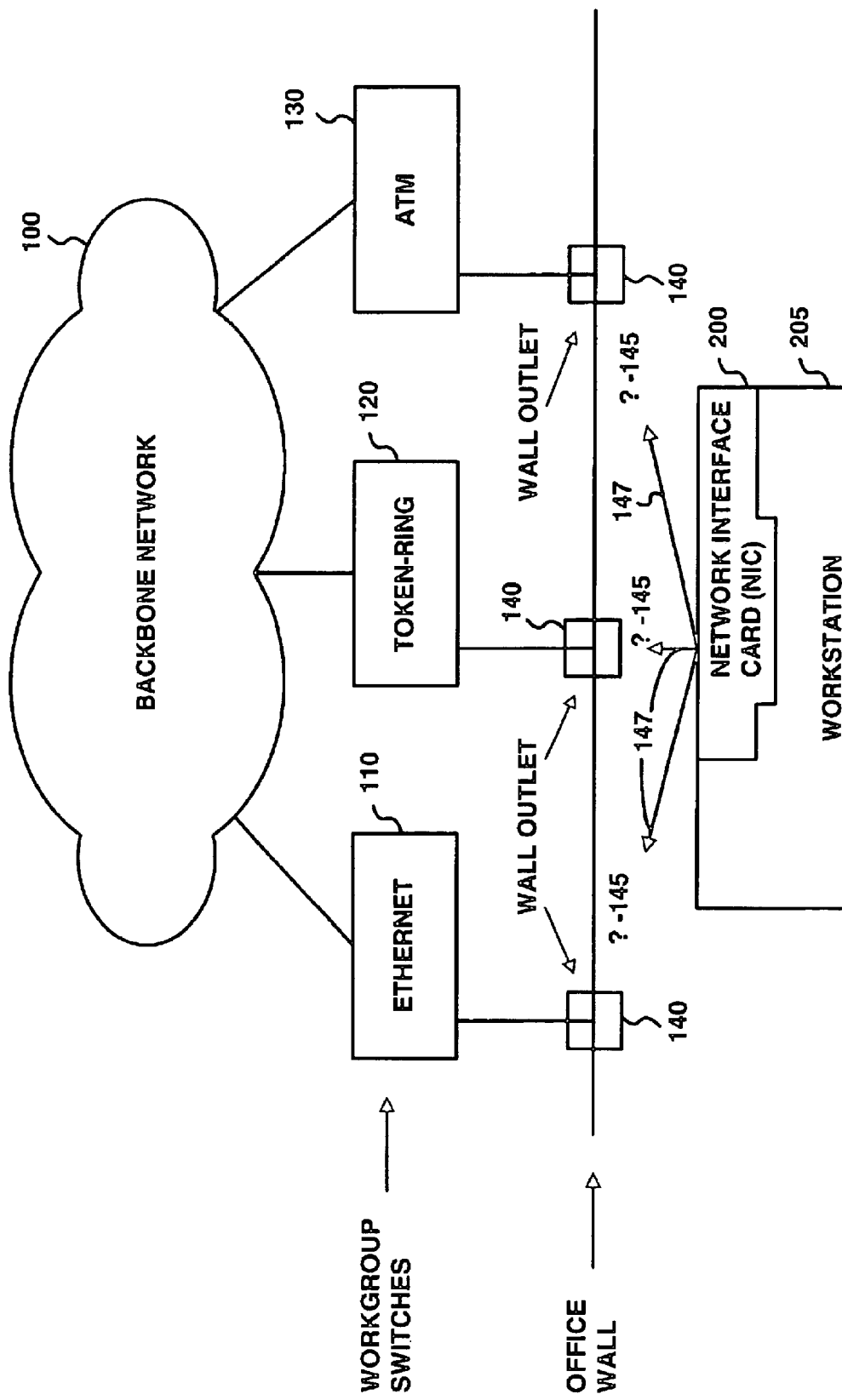
FIG. 2 is a diagram showing the topology of the standard LAN network and the automatic determination decision of the active LAN protocol type as made by the network interface card of the workstation according to the preferred embodiments of this invention.

In accordance with the invention, a method and apparatus is provided for multi-protocol LAN support, which is applicable to Ethernet, Token-Ring, and Asynchronous Transfer Mode (ATM) protocols. Referring to FIG. 2, a typical LAN network 100 is shown that has the end-stations 205 (workstations) attached to wall-outlets 140 in each office. The wall-outlets 140 provide a connector for attaching end-stations 205 to a LAN link that has wire or cable laid throughout a building, for instance, in the walls, floor, or ceiling. The wall-outlets 140 are each connected to a port of network 100 and to network interface card (NIC) 200 via links 147. NIC 200 receives and transmits messages configured in frames to network 100. The interface provided by network 100 to NIC 200 is any of the three most popular LANs, which are Ethernet, Token-Ring, or ATM.

NIC 200 is a LAN adapter card which is plugged into an adapter card slot in workstation 205. NIC 200 automatically detects whether the NIC 200 is connected to Ethernet, Token-Ring, or ATM. NIC 200 provides LAN support with automatic determination of the LAN protocol type and speed, i.e., wall outlet 140 can be attached to Ethernet 110, Token-Ring 120, or ATM 130 and NIC 200 will automatically determine which one of the LANs 110,120, 130 is active. NIC 200 responds only to the one active LAN type 110, 120, 130. FIG. 2 shows three wall outlets 140 each attached to a different LAN 110,120, 130; the meaning here is that each wall outlet 140 attaches to one and only one LAN type 110, 120, 130. The question marks 145 indicate that NIC 200 questions the type of LAN 110, 120, 130 to which it is attached and automatically determines the LAN support required from the three LAN candidate types 110, 120, 130. FIG. 2 does NOT mean that NIC 200 and workstation 205 attach simultaneous to three wall outlets 140, nor does a single NIC 200 simultaneously communicate with all three LANs 110, 120, 130. FIG. 2 is meant to show that NIC 200 and workstation 205 attach to any one of the LANs 110, 120, 130, and nothing more.

Figure 3:
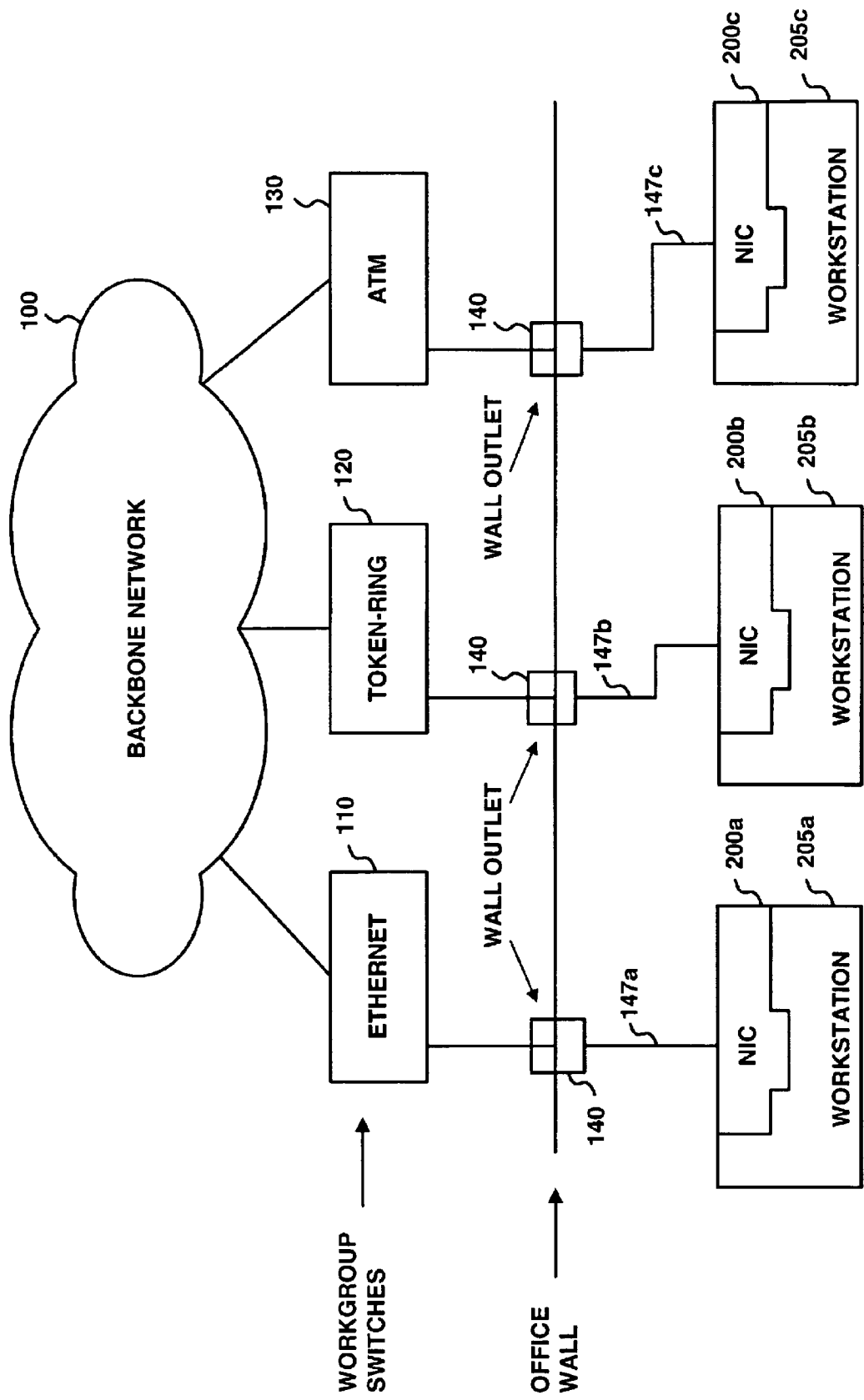
FIG. 3 is a diagram showing the topology of the standard LAN network and the connection to three workstations, wherein each workstation connects to a different LAN protocol and each has a network interface card implementing the automatic determination method according to the preferred embodiments of this invention.

Referring to FIG. 3, normal LAN to end-station attachments are shown, where each wall outlet 140 connects to a different copy of NIC 200 incorporated into different workstations 205*a*, 205*b*, and 205*c*. The same LAN adapter card type 200 is used in each workstation 205, such that NIC 205*a* automatically configures itself to communicate with Ethernet 110, NIC 205*b* automatically configures itself to communicate with Token-Ring 120, and NIC 205*c* automatically configures itself to communicate with ATM 130.

Wall outlets 140 are implemented using a standard connector called RJ-45 which is used to connect the workstation 205 to the LAN 110, 120, 130, regardless of the LAN protocol. All of the LANs of interest use the RJ-45 connector but use different contact assignments as shown in FIG. 1. For instance, a Token-Ring 120 operating at either 4 or 16 MHz uses contacts 3 and 6 (3/6) to support transmission of frames to the network 100, and contacts 4 and 5 (4/5) to support the receiving of frames from network 100. In contrast, ATM 130 uses contacts 1 and 2 (1/2) to support transmission of frames to the network 100, and contacts 7 and 8 (7/8) to support the receiving of frames from network 100. Ethernet 110 uses contacts 1 and 2 (1/2) to support transmission of frames to the network 100, and contacts 3 and 6 (3/6) to support the receiving of frames from network 100. The Ethernet contacts are defined in ISO/IEC 8802-3:1996. The Token-Ring contacts are defined in ISO/IEC 8802-5:1995. The ATM contacts are defined in the ATM Forum specification, "Physical Interface Specification for 25.6 Mb/s over Twisted Pair Cable," af-phy0040.000, Nov. 7, 1995, and "ATM Physical Medium Dependent Interface Specification for 155 Mb/s over Twisted Pair Cable," af-phy0015.000, September, 1994.

Figure 4:
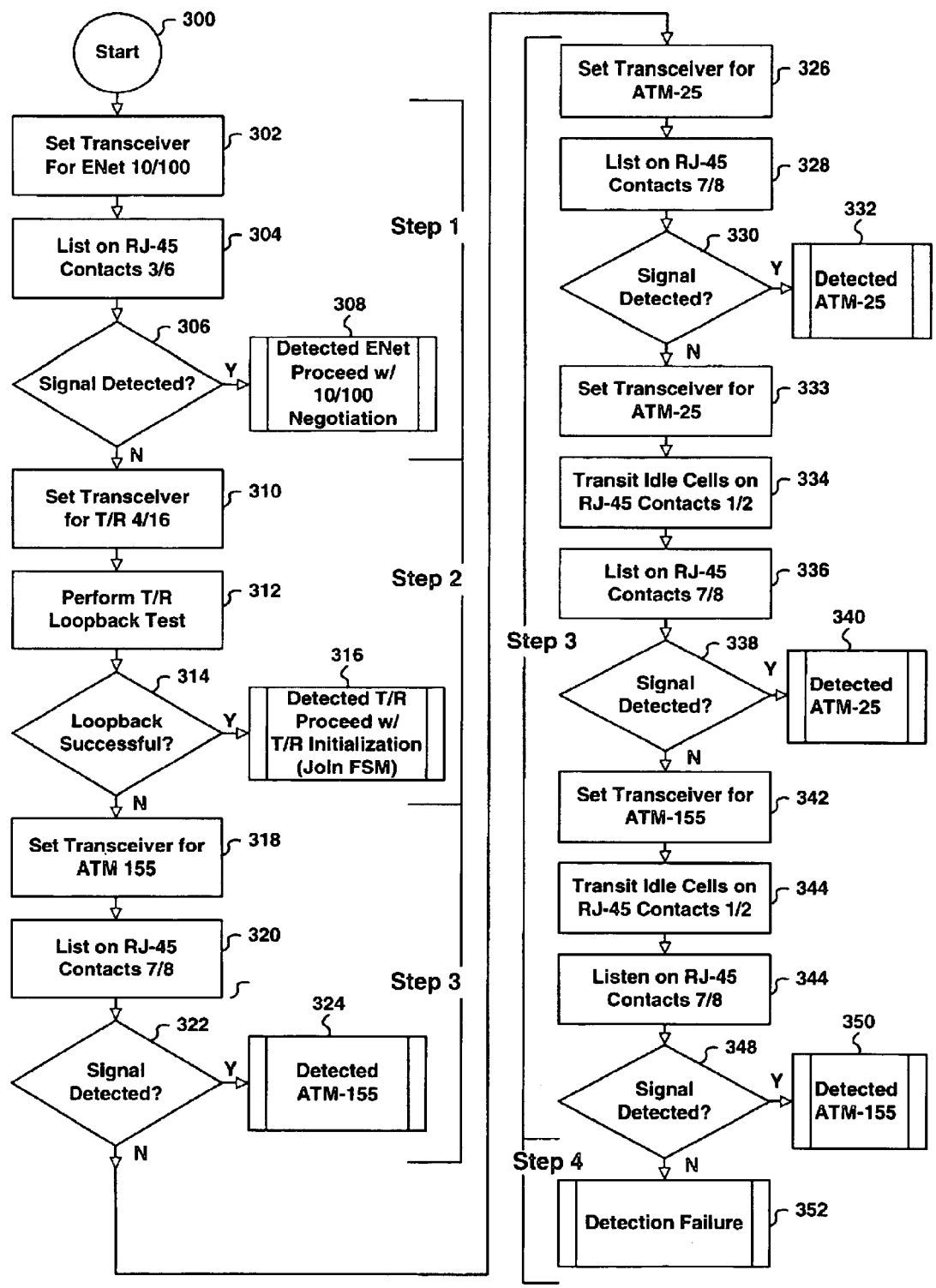
FIG. 4 is a flow chart showing the details of the protocol type and speed selection algorithm according to the preferred embodiment of this invention.

Referring to FIG. 4, the algorithm or logic process used by NIC 200 to detect the active LAN protocol type is shown. The logic provides for a non-disruptive detection of the LAN protocol by carefully ordering the protocol detection steps. First, the adapter tests for Ethernet by listening on the appropriate RJ-45 contacts. If Ethernet is not detected, the adapter tests for Token-Ring using the loopback test defined in the IEEE 802.5 Token-Ring standard. Finally, having determined that the LAN segment is not Ethernet or Token-Ring, the adapter tests for ATM-25 and then ATM-155. The test for ATM is first to listen, and then to transmit. The logic provides for positive detection of the LAN protocol. If none of the tests is successful, then the LAN protocol is unknown or the cable is not attached to the network.

In accordance with the invention, the automatic determination of the LAN type and speed is accomplished using four sequential steps with each step providing a unique function. The four steps are as follows:

Step 1—Ethernet Detection: The Ethernet network will always have detectable activity on the receive contacts 3/6 of FIG. 1 within a maximum time period of 24 ms. RJ-45 contact assignments guarantee that a Token Ring or ATM network do not cause activity on the RJ-45 3/6 pair. Therefore, activity on the 3/6 pair indicates an operational Ethernet network. The activity is comprised of either data frames being transmitted or link test pulses (LTP) being sent in the absence of data transmission. For Ethernet, a physical layer function called the MAU (Medium Attachment Unit) monitors for link integrity by sending a link test pulse (LTP) in the absence of received data. The MAU function for 100-TX extends this capability by using a compatible fast link pulse (FLP) to provide an auto-negotiation of 10/100 function in addition to the link integrity function.

Referring to FIG. 4, the detailed decision sequence associated with step 1 is shown to include flow chart entities 300 to 308. The sequence starts with entity 300. In block 302, the transceiver for network link 147 of FIG. 2 is set to either Ethernet (ENET) speed—10 or 100 Mbps. NIC 200 then listens on the 3/6 contact pair of the RJ-45 connector for (data) activity or the LTP as shown in block 304. NIC 200 determines if a signal is detected on the 3/6 contact pair as shown by block 306. NIC 200 is in listen mode and does not transmit any data frames or LTPs. The same listening procedure 304,306 is used for either of the Ethernet speeds: 10 or 100 MHz. If (data) activity or LTPs are detected, the unknown LAN type 110, 120, 130 is determined to be ENET 10 or 100. Once the LAN is determined to be Ethernet 110, the NIC 200 will send FLP messages on the transmit link to negotiate between 10 Base-T or 100 Base-TX operation as shown by block 308. The auto-negotiation procedure is defined in IEEE Std 802.3u-1995 "Media Access Control (MAC) Parameters, Physical Layer, Medium Attachment Units, and Repeater for 100 Mb/s Operation, Type 100 BASE-T," in clause 28.

If there is no signal detection on the 3/6 contact pair, the network is determined not to be Ethernet 110, and Step 2 (flow chart entities 310 to 316) is invoked.

Although the Ethernet detection step has been described with reference to Ethernet speeds of 10 or 100 Mbps, other speeds that are defined using an RJ-45 connector and the same contact assignments are possible and within the scope of the invention.

Step 2—Token-Ring Detection: Step 2 includes flow chart entities 310 to 316. If the LAN segment is Token-Ring, NIC 200 will not receive any frames initially unless it sends messages to itself. NIC 200 issues a loopback test, i.e., transmits a frame to network 100 over the 3/6 contact pair of the RJ-45 connector, which traverses the network and is addressed to return to the same RJ-45 connector over the receiving contact pair 4/5. If the loop-back message returns to the workstation, then the protocol must be Token-Ring. This is guaranteed since the Token-Ring RJ-45 contacts 4/5 for receive are not used for transmit/receive in ATM. Note that it is first required to verify that the LAN is NOT Ethernet prior to a loop-back test for Token Ring, because if the transmission of the loop-back message is on what is actually an Ethernet network it would disrupt that network. Also note that ATM verification is not yet required because contact assignments for Token Ring and ATM are mutually exclusive such that there is no disruption if the actual network is ATM.

NIC 200 transmits and detects the reception of loopback messages by transmitting one speed at a time over the Token-Ring RJ-45 contacts 3/6 and listening for a return on contacts 4/5. Referring to FIG. 4, in block 310 the transceiver for network link 147 of FIG. 2 is set to Token-Ring (T/R) speed: 16 Mbps. Loopback messages are transmitted over contact pair 3/6 by NIC 200 as shown by block 312. NIC 200 checks for the reception of loopback messages. If the loopback message returns successfully, block 314 selects block 316 to be executed next. Block 316 performs ring insertion and auto-speed detection to determine if the Token-Ring speed is 4 or 16 Mbps. The detection method for determining the Token-Ring media speed is not unique to the present invention. The detection method is disclosed by U.S. Pat. No. 5,442,629, "Token Ring Speed Detector" by Geyer et al., and is used directly for the implementation of block 316. The detection method is well documented, and the details are not included herein.

If the loopback messages transmitted by the workstation are NOT received by that workstation, then the LAN segment is NOT an operational Token Ring. Block 314 selects to go to Step 3.

Although the Token Ring detection step has been described with reference to speeds of 4 or 16 Mbps, other speeds that are defined using an RJ-45 connector and the same contact assignments are possible and within the scope of the invention.

STEP 3—ATM Detection: Step 3 includes flow chart entities 318 to 350. For ATM, it is possible for other ports on the ATM LAN to be in the receive-only state when the link is idle, which is a valid mode of operation. Thus, the process of determining ATM-25 or ATM-155 involves both listening and active transmission. The process of determining an ATM LAN first involves listening for both media speeds. The order of the listening events can be ATM-25 and then ATM-155 or ATM-155 and then ATM-25, and the procedure described in this section will still detect the appropriate protocol media speed. Referring to FIG. 4, NIC 200 first sets the transceiver for media speed 155 Mbps, as shown by block 318, and listens for frames arriving on the RJ-45 connector contacts 7/8 as shown by block 320. If properly framed idle cells are received, then block 322 detects that the LAN is ATM-155 as shown by block 324. If an ATM-155 link is not detected, then block 322 selects block 326, and the transceiver is set for media speed 25.6 Mbps, and the adapter listens on the RJ-45 connector contacts 7/8 as shown by block 328. If properly framed idle characters are received as detected by block 330, then the LAN is ATM-25 as shown by block 332.

If neither listening attempt for ATM indicated the ATM media speed, then NIC 200 transmits idle characters to network 100 in case the LAN is ATM and the other ports are in the receive-only state. This will provide detectable activity if the LAN is ATM. At this point, block 330 controls the further testing by selecting block 333. The transceiver is set for media speed 25.6 Mbps as shown by block 333. NIC 200 transmits idle characters to network 100 on the RJ-45 connector contacts at 1/2 as shown by block 334. NIC 200 then listens for a valid signal on the RJ-45 connector contacts 7/8 as shown by block 336. If NIC 200 detects a valid signal as shown by block 338, then ATM connection is determined to be ATM-25 as shown by block 340. If NIC 200 does NOT detect a valid signal as shown by block 338, block 342 is selected next.

The transceiver is set for media speed 155 Mbps as shown by block 342. NIC 200 transmits idle characters to network 100 on the RJ-45 connector contacts 1/2 as shown by block 344. NIC 200 then listens for a valid signal on the RJ-45 connector contacts 7/8 as shown by block 346. If NIC 200 detects a valid signal as shown by block 348, then ATM connection is determined to be ATM-155 as shown by block 350. If NIC 200 does NOT detect a valid signal as shown by block 348, a failure is detected as none of the LANs of interest were found to be connected to NIC 200.

Transmitting on an ATM link 147 to determine the line speed is non-disruptive to the network 100, because ATM is a point-to-point switched network. For instance, Token-Ring is a loop connection where all end-stations 205 are connected to the loop. Any frame sent over the Token-Ring must traverse the intermediate end-stations to get to the desired destination. However, ATM does not interconnect in a loop but is switched directly from the transmitter to the receiver without having the message pass through other end-stations. Therefore, transmitting on ATM is not disruptive to the other end-stations.

The order of the transmission attempts (ATM-25 and then ATM-155) could be reverse, and the procedure described herein as step 3 would still operate correctly and determine the proper LAN type and speed.

Although the ATM detection step has been described with reference to ATM speeds of 155 or 25.6 Mbps, other speeds that are defined using an RJ-45 connector and the same contact assignments are possible and within the scope of the invention.

STEP 4: No LAN Detected: In the event that steps 1, 2, and 3 fail to determine the network 100 protocol, then NIC 200 detects an error event and makes appropriate notification to the user as shown by block 352 of FIG. 4. The error event can occur due to a failure condition which may be either permanent or transient. NIC 200 declares the failure to the user, and at the option of the user NIC 200 may be commanded to retry the protocol detection process beginning from block 300.

Network Interface Card Description: The Network Interface Card (NIC) 200 uses the RJ-45 connector to interface to the LAN 100 and contains circuitry to adapt the LAN to the workstation's input/output (I/O) bus. A single LAN having one of the protocols of interest (Ethernet, Token Ring, or ATM) is attached via the RJ-45 connector and the adapter card 200 will automatically detect the LAN type 110, 120, 130 and respond to it. In addition the adapter card 200 detects and supports two different speeds for each LAN type.

Figure 5:
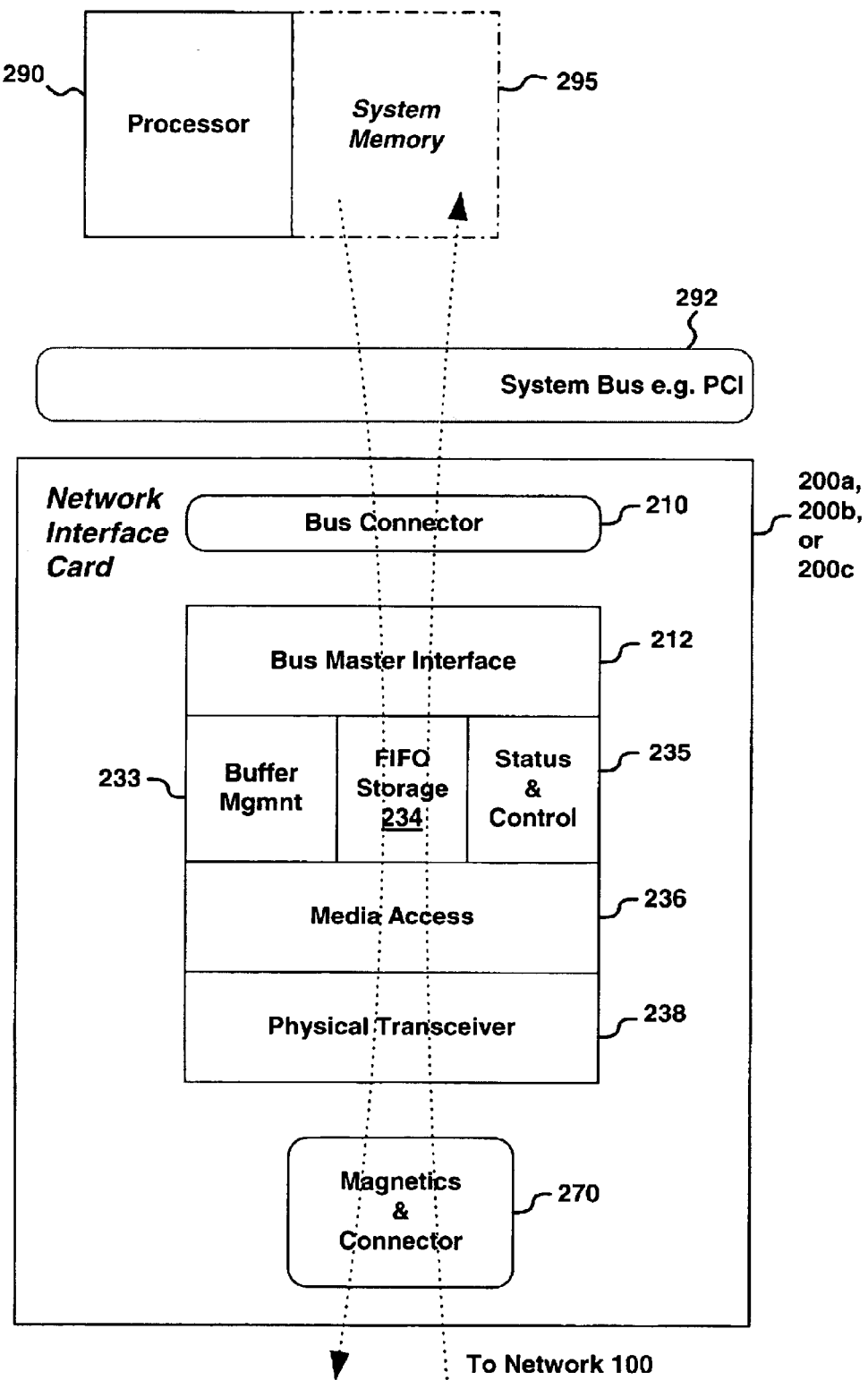
FIG. 5 is a block diagram showing the typical implementation of the network interface adapter function according to the prior art.

In general, low cost NICs generally are integrated into a single chip and organized as shown in FIG. 5. NIC 200 resides in workstation 205, which is further comprised of processor 290 and system memory 295. NIC 200 has two interfaces, one to the workstation system 290, 295 and one to network 100. For workstation 205 communications to adapter 200, NIC 200 interfaces with processor 290 and system memory 295 via system bus 292, which is usually the PCI bus. Bus interface connector 210 is used to connect NIC 200 to bus 292, and bus master interface 212 controls the NIC interface to bus 292 by moving data to and from system memory 295. FIFO storage 234 is used for intermediate data storage and speed matching of bus 292 to the network 100. Buffer management 233 is used for managing the data flow between system memory 295 and FIFO storage 234, as the data flows through bus master interface 212. Status and control section 235 provides the hardware control interface for the software device driver running on processor 290.

The NIC 200 interface to network 100 is comprised of media access layer 236 which runs the network protocol and the physical transceiver 238 which is the line driver and receiver to interface to network 100. Physical transceiver 238 is connected to network 100 through transformers and other electrical components and connector block 270 which includes the RJ-45 connector described in FIG. 1. Most NICs today consist of a single chip device of this type mounted on a PC card with a connector for the host bus 210 and a connector 270 for the network interface. The NIC 200 shown in FIG. 5 is consistent with the prior art, where one NIC 200 interfaces to one LAN type 110, 120, 130. Three different cards are required, one card to interface with each of the three LAN types: Ethernet, Token-Ring, and ATM. The three different cards would each contain identical bus connector 210 blocks, bus master interface 212 blocks, FIFO storage 234 blocks, and magnetics and connector 260 blocks. However, each of the three card types would contain different buffer management 233 blocks, Status & control 235 blocks, media access control 236 blocks, and physical transceiver 238 blocks to tailor its operation to one of the LANs: Ethernet, Token-Ring, or ATM.

Figure 6:
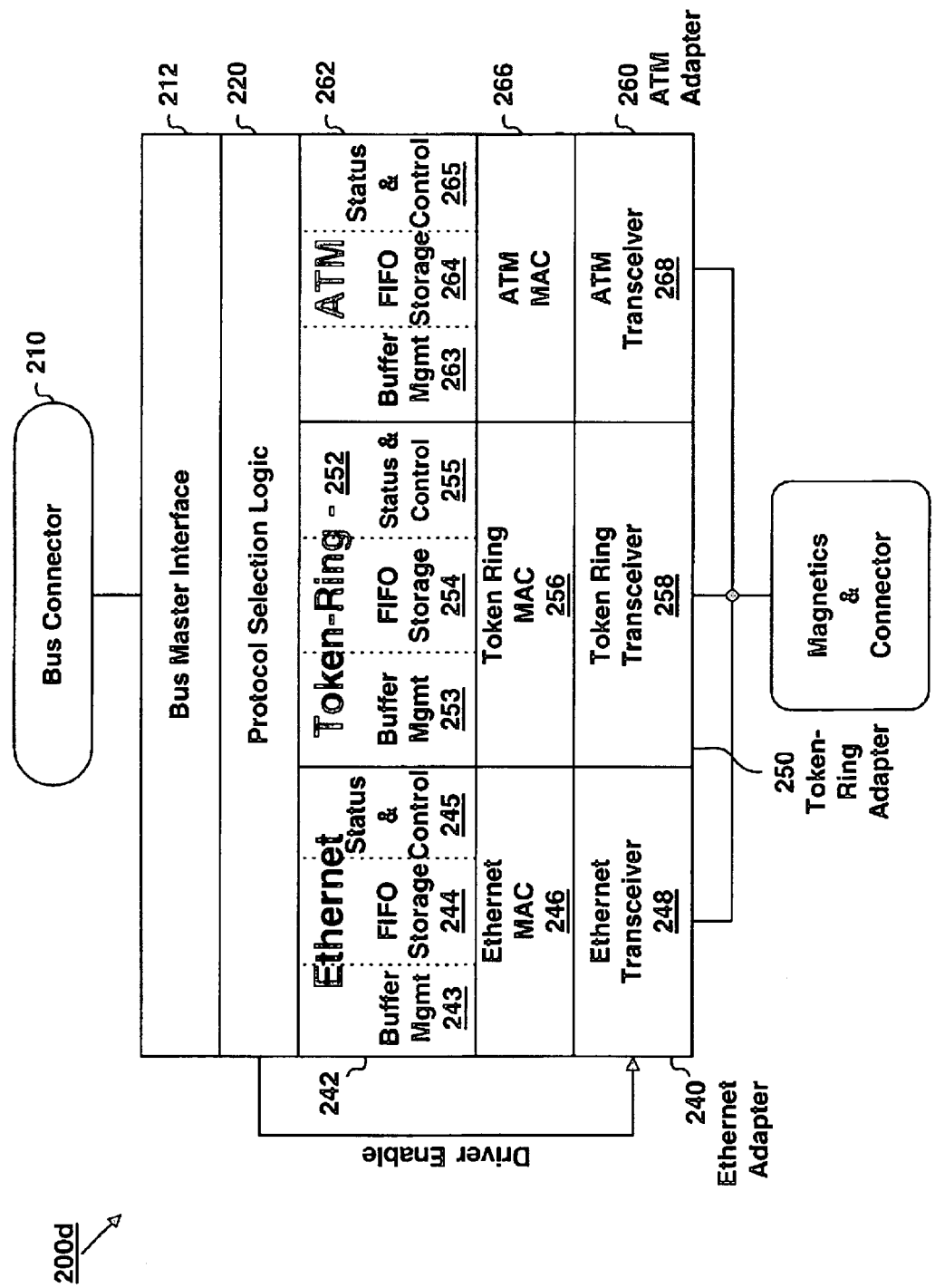
FIG. 6 is a diagram showing a first functional implementation of the network interface adapter card for determining the protocol type and speed of the LAN connected to the workstation according to the embodiment of this invention.

In contrast, FIG. 6 shows the first embodiment of the present invention where all three of the card types described by FIG. 5 are combined into a single card 200d comprised of the automatic protocol determination function. The NIC 200d is a multi-protocol adapter which contains independent physical transceivers 248, 258, 268; independent media access controls (MAC) 246, 256, 266; independent buffer management controls 243, 253, 263; independent status & control sections 245, 255, 265; and independent data movement FIFO storage units 244, 254, 264 for the Ethernet, Token Ring, and ATM protocols. The protocol selection logic 220 performs the logic detailed in FIG. 4. The protocol selection logic 220 individually enables the different adapter entities 240, 250, 260 in the process of determining the network protocol. With this implementation, the protocol selection logic 220 performs more operations in parallel, in particular those operations involving listening for network activity, such as blocks 304 and 320 of FIG. 4. This allows for quicker determination of the network protocol. However, the NIC 200d of FIG. 6 has the disadvantage of requiring the high cost of providing each of the individual entities 240, 250, and 260.

Figure 7:
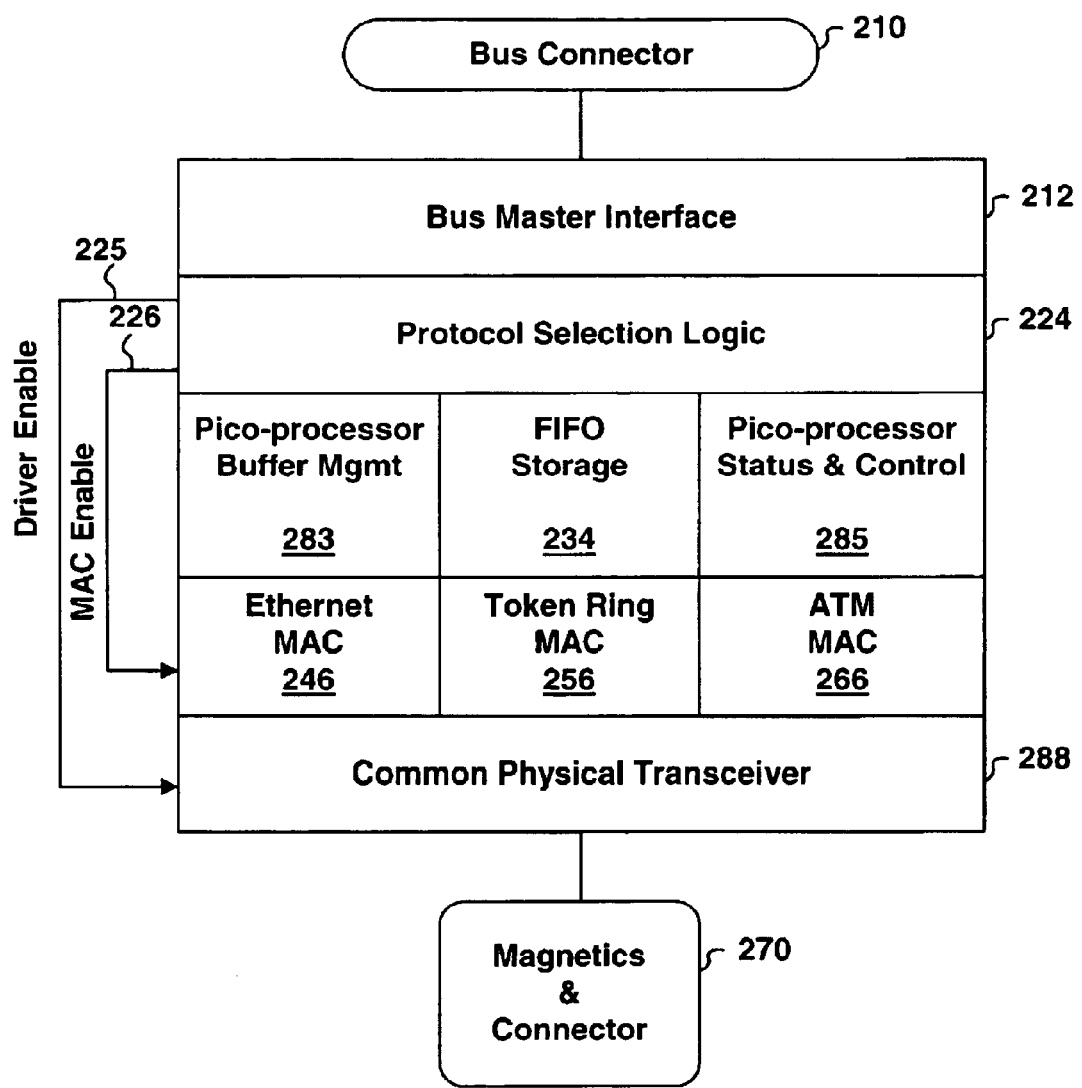
FIG. 7 is a diagram showing a second functional implementation of the generic network interface adapter card for determining the protocol type and speed of the LAN connected to the workstation according to the preferred embodiment of this invention.

Referring to FIG. 7, a more cost effective solution is the second and preferred embodiment of the present invention, which provides a multi-protocol NIC 200e with a configurable, pico-processor or state machine based entities 283, 285. The NIC 200e contains the same bus connector 210 block, bus master interface 212 block, FIFO storage 234 block, and magnetics and connector 270 block as NIC 200a, 200b, and 200c. However, pico-processor controlled buffer management 283 is a new configurable entity that is capable of doing the same functions provided by all three buffer management entities 243, 253, and 263 of NIC 200d (FIG. 6). Likewise, pico-processor controlled status & control section 285 is a new configurable entity that is capable of doing the same functions provided by all three status & control sections 245, 255, and 265 of NIC 200d. The buffer management 283 and status & control 285 are programmable entities that are controlled by a pico-processor, such that blocks 283 and 285 are adaptable to any network specific functions required to support Ethernet, Token-Ring, or ATM networks. NIC 200e has independent entities 246, 256, 266 for each of the MAC protocols, since they each have very specific requirements. A common physical transceiver 288 is used, as this is considered viable in the state-of-the-art technology. The approach works equally well with independent transceiver entities 248, 258, and 268 of FIG. 6 replacing transceiver 288. The protocol selection logic 224 performs the four step process detailed in FIG. 4. However, the protocol selection logic of NIC 200e is slightly different than the protocol selection logic 220 of NIC 200d (FIG. 6) in that it does not perform any operations in parallel. Due to the use of common functions for pico-processor controlled entities 283, 285, the process must be followed in a sequential manner as shown in FIG. 4.

The advantage of the present invention is that a common network interface adapter card is used to interface to any of the popular LANs: Ethernet, Token-Ring and ATM. The common card has the capability to automatically determine the type and speed of the LAN to which it is connected.

It is a further advantage of this invention that protocol type and speed detection is provided using active transmission of test frames on a non-disruptive basis that does not affect the operation of the network in relation to other attachments during the protocol search process.

Alternative Embodiments

An alternative embodiment of the present invention is to provide the LAN interface determination and function as part of the processor planar design. A planar is a multi-layer interconnection board used for mounting the processor, its memory and associated functions and interfaces.

Figure 8:
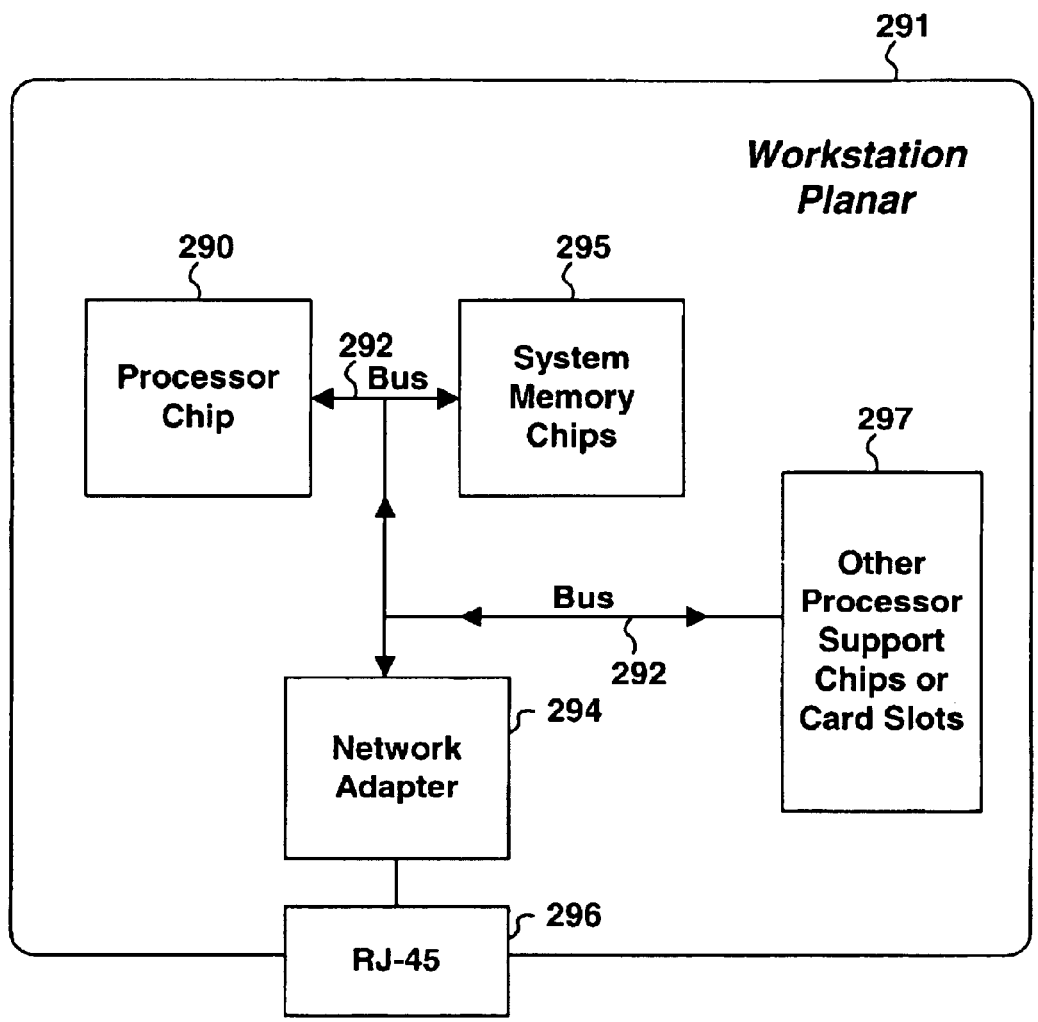
FIG. 8 is a diagram showing an alternative functional implementation of the network interface adapter for determining the protocol type and speed using a chip mounted on the processor planar according to the embodiment of this invention.

Since the network adapter function implemented in NIC 200 is usually provided as a single chip, it can be mounted on an adapter card as described hereinbefore, or mounted directly on the processor planar as a planar embedded function of the workstation. Referring to FIG. 8, the workstation planar 291 is shown containing processor 290, system memory 295, network adapter 294, other processor support chips or card slots 297, and RJ-45 connector 296 for interfacing to network 100. In this alternate embodiment, no pluggable adapter card 200 is required to interconnect to network 100. Instead, the network adapter chip 294 provides the exact same automatic protocol determination features performed by the NIC 200 for determining the LAN type and speed.

It will be appreciated that, although specific embodiments of the invention have been described herein for purposes of illustration, various modifications may be made without departing from the spirit and scope of the invention.

Accordingly, the scope of protection of this invention is limited only by the following claims and their equivalents.

What is claimed is:

1. A network interface card for interfacing between a processor system and one of a plurality of local area network (LAN) types and LAN speeds, wherein said network interface card includes a plurality of media access controllers, each of the plurality of media access controllers adapted to detect different LAN types from the plurality of LAN types, whereby each of the plurality of LAN types includes a different media access control layer, the network interface card comprising:

means that automatically determines the LAN type;

means that automatically determines the LAN speed of the LAN to which said network interface card is connected, wherein said plurality of LAN types and LAN speeds are comprised of one or more of the following: Ethernet operating at either 10 or 100 MHz rates, Token-Ring operating at either 4 or 16 MHz rates, and Asynchronous Transfer Mode operating at either 25.6 or 155 MHz rates that includes receive-only mode.

2. The network interface card of claim 1, wherein the determined LAN type and LAN speed is automatically selected for subsequent support of data transmission to and from said LAN to which said network interface card is connected.

3. The network interface card of claim 1, wherein said plurality of LAN types and LAN speeds are comprised of one or more of the following: Ethernet using RJ-45 connector contacts 1 and 2 for transmitting frames to a network and RJ-45 connector contacts 3 and 6 for receiving frames from a network, Token-Ring using RJ-45 connector contacts 3 and 6 for transmitting frames to a network and RJ-45 connector contacts 4 and 5 for receiving frames from a network, and Asynchronous Transfer Mode using RJ-45 connector contacts 1 and 2 for transmitting frames to a network and RJ-45 connector contacts 7 and 8 for receiving frames from a network.

4. The network interface card of claim 1, wherein said means for automatically determining the LAN type and LAN speed is performed on a non-disruptive basis that does not affect the operation of the LAN.

5. A network interface card for interlacing between a processor system and one of a plurality of local area network (LAN) types and LAN speeds, wherein said neework interface card includes a plurality of media access controllers, each of the plurality of media access controllers adapted to detect different LAN types from the plurality of LAN types, whereby each of the plurality of LAN types includes a different media access control layer, the network interface card comprising:

means for automatically determining the LAN type and the LAN speed of a LAN to which said network interlace card is connected;

means for providing multi-protocol LAN support; and means for automatically adapting the LAN support required for data transmission to conform to a network protocol provided by the LAN type and the LAN speed;

wherein the detection is nondisruptive to the LAN to which said network interface card is connected and wherein said plurality of LAN types and LAN Speeds are comprised of one or more of the following: Ethernet operating at either 10 or 100 MHz rates, Token-Ring operating at either 4 or 16 MHz rates, and Asynchronous Transfer Node operating at either 25.6 or 155 MHz rates that includes receive-only mode.

6. The network interface card of claim 5, wherein said plurality of LAN types and LAN speeds are comprised of one or more of the following: Ethernet using RJ-45 connector contacts 1 and 2 for transmitting frames to a network and RJ-45 connector contacts 3 and 6 for receiving frames from a network, Token-Ring using RJ-45 connector contacts 3 and 6 for transmitting frames to a network and RJ-45 connector contacts 4 and 5 for receiving frames from a network, and Asynchronous Transfer Mode using RJ-45 connector contacts 1 and 2 for transmitting frames to a network and RJ-45 connector contacts 7 and 8 for receiving frames from a network.

7. The network interface card of claim 5, wherein said means for automatically determining the LAN type and the LAN speed performs on a non-disruptive basis that does not affect the operation of the LAN.

8. A method for causing a station to enter a communications network including the steps of using a network interface card to automatically determine a type of the communications network to which the network interface card is connected, whereby the network interface card includes a plurality of media access controllers, each of the plurality of media access controllers adapted to detect different LAN types from a plurality of LAN types, whereby each of the plurality of LAN types includes a different media access control layer;

using the adapter to determine the speed at which information is being transmitted on said communications network and to automatically select and transfer data with a protocol compatible with the determined communications network type;

transferring said data at a speed compatible with the determined speed of said determined communications network type;

detecting whether an Ethernet LAN type exists from the plurality of LAN types;

detecting whether a Token-Ring LAN type exists from the plurality of LAN types in response to not detecting the existence of the Ethernet LAN type; and detecting whether an asynchronous transfer mode type exists from the plurality of LAN types in response to not detecting the existence of the Token-Ring LAN type.

9. The method of claim 8 wherein the communications network type includes Token-Ring, Ethernet or asynchronous transfer mode.

10. The method of claim 8 further including the steps of formatting and transmitting data at a speed and protocol compatible with the communications network type.

11. A network interface card including:

a plurality of media access controllers, each of the plurality of media access controllers adapted to detect different LAN types from a plurality of LAN types, whereby each of the plurality of LAN types includes a different media access control layer;

a plurality of interface circuits operable to couple said network interface card to one of a plurality of different communications network types;

selection logic that automatically determines the communications network type and activating one of the plurality of interfaces based upon the detected communications network types;

a circuit that detects the speed of data on the detected communications network type; and a circuit that configures the adapter to transfer data at the detected speed.

12. The network interface card of claim 11 further including a circuit that detects the speed of data on the detected communications network type and configuring the adapter to transfer data at the detected speed.

13. The network interface card of claim 11 further including a protocol detector that detects the protocol on the detected communications network type and configuring the interlace and transmit data formatted in accordance with the detected protocol.

14. A system including:

a computer system including a system bus;

a network interface card operatively coupled to the system bus, said network interface card including a plurality of media access controllers, each of the plurality of media access controllers adapted to detect different LAN types from a plurality of LAN types, whereby each of the plurality of LAN types includes a different media access control layer;

selection logic that automatically determines the communications network type, network speed and activating one of the plurality of interfaces based upon the detected communications network types and network speed; and a connector operatively coupling said network interface card to a communications network.

15. The system of claim 14 wherein the communications network includes a Local Area Network.

16. The system of claim 15 wherein the connector includes an RJ-45 connector.

17. The system of claim 16 wherein the RJ-45 connector includes a plurality of contacts with selected ones being assigned to receive or transmit signals from/to different types of a Local Area Network.

18. The system of claim 17 further including a first circuit arrangement operatively positioned in the selection logic, said first circuit arrangement monitoring signals received from selected contacts to determine one type of local area network.

19. The system of claim 18 further including a second circuit arrangement that generates and forwards signals on selected contacts; and a third circuit arrangement that receives the forwarded signal which is used to determine another type of local Area Network.

* * * * *

UNITED STATES PATENT AND TRADEMARK OFFICE
CERTIFICATE OF CORRECTION

PATENT NO.    : 6,928,086 B2
DATED         : August 9, 2005
INVENTOR(S)   : Abler et al.

It is certified that error appears in the above-identified patent and that said Letters Patent is hereby corrected as shown below:

<u>Column 12,</u>
Line 55, delete "interlacing" and insert -- interfacing --.
Line 57, delete "neework" and insert -- network --.
Line 66, delete "interlace" and insert -- interface --.

<u>Column 14,</u>
Line 26, delete "interlace" and insert -- interface --.

Signed and Sealed this

Seventh Day of February, 2006

JON W. DUDAS
*Director of the United States Patent and Trademark Office*